United States Patent [19]
Agostinelli et al.

[11] Patent Number: 4,797,694
[45] Date of Patent: Jan. 10, 1989

[54] SCAN-MULTIPLEXED LIGHT VALVE PRINTER WITH BAND-REDUCING CONSTRUCTION

[75] Inventors: John A. Agostinelli, Rochester; José M. Mir, Webster, both of N.Y.

[73] Assignee: Eastman Kodak Company, Rochester, N.Y.

[21] Appl. No.: 99,954

[22] Filed: Sep. 23, 1987

[51] Int. Cl.⁴ ............................................. G01D 15/00
[52] U.S. Cl. .................................. 346/160; 346/107 R
[58] Field of Search ................... 346/160, 154, 107 R, 346/108; 340/146.3; 358/75; 250/578; 350/356; 101/DIG. 3; 400/119

[56] References Cited
U.S. PATENT DOCUMENTS

| | | | |
|---|---|---|---|
| 3,264,611 | 8/1966 | Lohmann | 340/146.3 |
| 4,374,397 | 2/1983 | Mir | 358/75 |
| 4,377,753 | 3/1983 | Mir | 250/578 |
| 4,415,915 | 11/1983 | Sprague et al. | 346/160 |

Primary Examiner—Arthur G. Evans
Attorney, Agent, or Firm—John D. Husser

[57] ABSTRACT

A system for improving the uniformity of light valve imaging apparatus of the kind having an array of spaced light valve portions, a source for directing generally uniform illumination through the light valve portions, and means for scan-indexing the light valve image along an image zone. The improved system comprises source-scan means for scanning the source illumination onto the light valve array in synchronism with the scan-indexing of the light valve image.

6 Claims, 5 Drawing Sheets

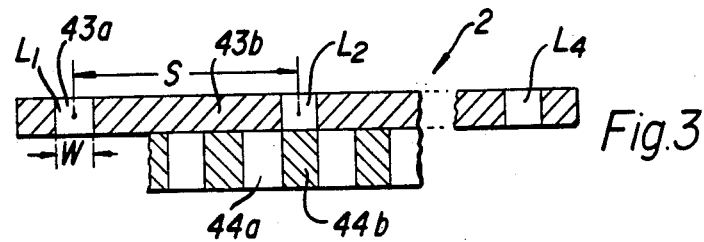
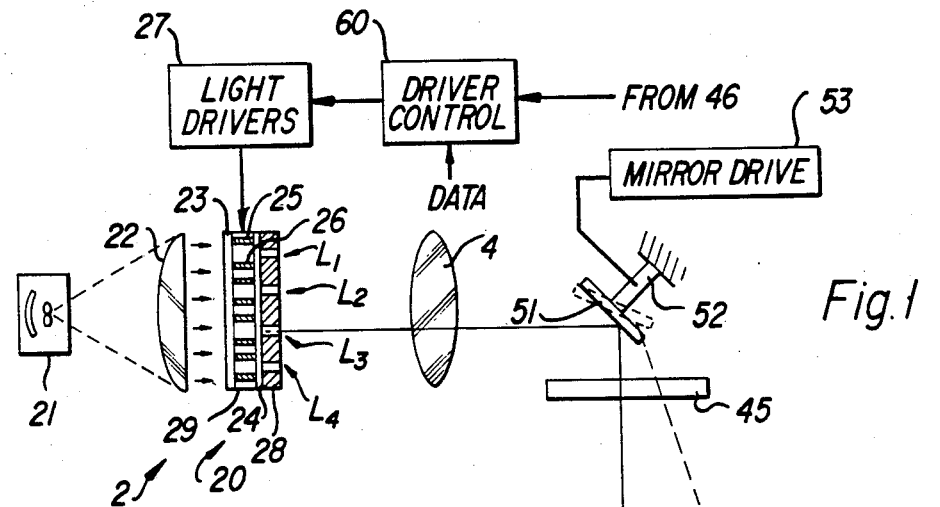
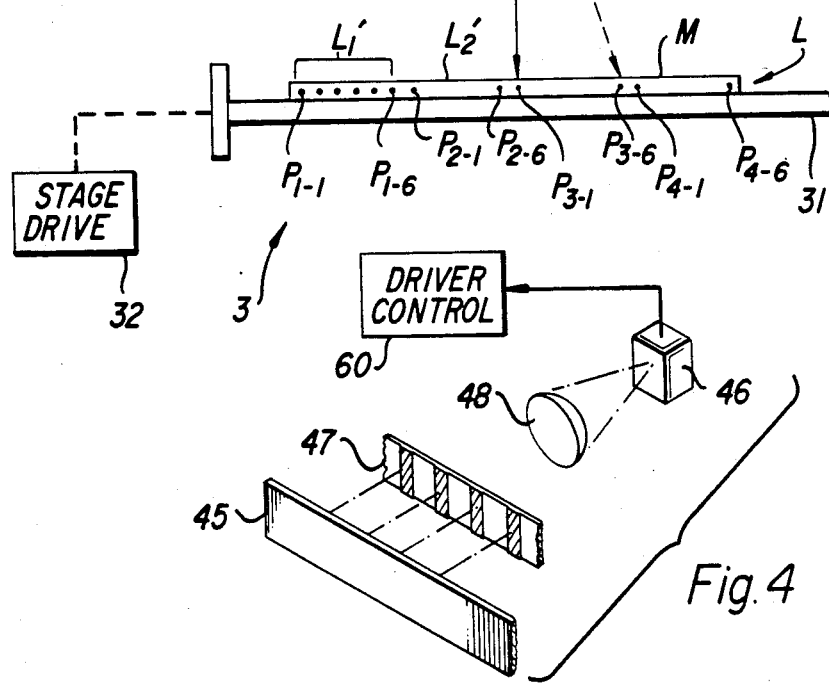

SCAN-MULTIPLEXED LIGHT VALVE PRINTER WITH BAND-REDUCING CONSTRUCTION

FIELD OF THE INVENTION

The present invention relates to light valve printers in which effective resolution is increased by scan-multiplexing the light valve array image at the print zone and more particularly to improved constructions for reducing "stair-step" type banding artifacts in the output of such printers.

BACKGROUND OF THE INVENTION

U.S. patent application Ser. No. 99,953, entitled "System for High Resolution Exposure Address With Coarser Resolution Exposing Array", filed Sept. 23, 1987, by Agostinelli and Mir, describes advantageous imaging devices wherein an object source array (e.g. comprising a linear array of light valve elements) of relatively coarse resolution is imaged at a print zone in a manner providing a relatively higher resolution exposure. In one preferred embodiment, this approach utilizes (i) an object array having exposing pixels of width (W) located with intervening non-exposing spaces so as to have a center-to-center spacing S and (ii) a scan multiplexing optical system, e.g. including lens means and a mirror, which indexes the image of the exposing array in a number of increments, approximately $S \div W$, to successive positions across a linear print zone. This system offers important advantages in simplifying array fabrication and in reducing electronic complexities.

In certain applications, e.g. in printing high quality continuous tone images, undesirable banding artifacts have been found to occur in the print output from the above-described system. We have discovered the cause of these artifacts to be the emphasis which that multiplex system adds to the non-uniform intensity profile of source light transmitted to the light valve array.

SUMMARY OF THE INVENTION

One important object of the present invention is to provide a scan-multiplex light valve array printing system which obtains the advantages of the above cited Agostinelli and Mir approach, but which significantly reduces the banding artifacts in print output from the system. Thus one advantage of the present invention is the significant improvement of output attained for scan-multiplex, light valve printing. Another advantage of the present invention is that such output improvements are accomplished in a simple and reliable construction that is applicable to a variety of different light sources without special adaptation.

In one aspect, the present invention constitutes in light valve imaging apparatus of the kind having (i) a linear light valve array comprising a plurality of selectively activatible light valve portions having approximately equal linear widths and center-to-center spacings, (ii) a source for directing generally uniform illumination through those light valve portions, (iii) an optical system for forming an image of those light valves at a linear image zone and (iv) multiplexing means for scan-indexing that image along the image zone in a plurality of increments, the improvement comprising source-scan means for scan-indexing the illumination from the illumination source means onto the light valve array in synchronism with the scan-indexing by the multiplexing means.

BRIEF DESCRIPTION OF THE DRAWINGS

The subsequent description of preferred embodiments of the invention refers to the attached drawings wherein:

FIGS. 1-4 are schematic illustrations of one scan-multiplexing system, such as described in the background art section, in which the improved constructions of the present invention can be implemented;

DETAILED DESCRIPTION OF THE PREFERRED EMBODIMENTS

Figure 2:
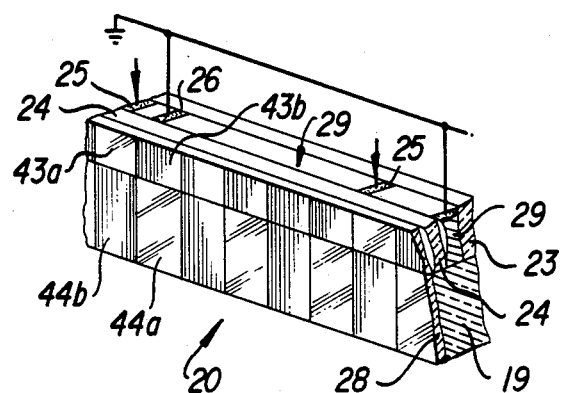

FIGS. 1-4 illustrate one embodiment of printer system disclosed in the above-cited Agostinelli et al application. The detail structure of that light valving system, as well as light directing system downstream therefrom, is exemplary of structures which can be used in systems according to the present invention. Thus the embodiment shown in FIG. 1 is a multiplexing printer comprising, in general, an object array sub-system 2 providing a plurality of selectively activatible exposure elements, a print station 3 constructed and located to transport successive line portions of print medium M to and through a print zone L, lens means (represented by lens 4) that is constructed and located to form an image of the object array 2 at the print zone (at a selected magnification F, e.g. 1:1, 2:1, 1:2, etc.) and a scan sub-system 5 that is constructed and located to index the light image of object array sub-system 2 to different locations at the print zone L.

The object array sub-system 2 includes a light source 21 providing uniform illumination to a collimator lens 22, which in turn directs collimated light onto the ingress polarizer element 23 of light valve array 20. The light valve array 20, shown in more detail in FIG. 2, also comprises an electro-optic panel 29, which is sandwiched between ingress polarizer 23 and egress polarizer 25. The panel 29 is formed to have a plurality of discrete exposure portions by construction of spaced electrode structures 25, 26 in a manner which enables selective application of an electrical field in a direction transverse to the direction of light passing through the panel. Such light valve structures are known in the art, e.g. see U.S. Pat. Nos. 4,371,892 and 4,569,573. In general, such arrays function with the directions of the polarizers 23, 24 at 90° relative to each other, and the electro-optic panel 29 (e.g. formed of PLZT material) is adapted to change the polarization direction of passing light by 90° when an activating electric field is applied across the electrodes. Usually one electrode of each pixel portion pair is at a reference electrode 25, e.g. at ground potential, and the other is an address electrode, selectively energizable by driver circuits 27. Thus when the energizable electrode 25 is energized, the field between it and reference electrode 26 will cause the electro-optic material therebetween to change the direction of polarized light from ingress polarizer 23 by 90°; therefore such modulated light will pass through egress polarizer 24. When the address electrode 25 of an array pixel portion is not energized, there will be no change in the polarization of light passing that modulator panel portion and such light will be blocked by the egress polarizer. In the FIGS. 1 and 2 embodiment a mask layer 28 is provided, e.g. formed on egress polarizer 24, and comprises light transparent portions 43a, aligned between electrode pairs, and light opaque portions 43b, interspaced between those transparent portions. In another preferred embodiment (not shown), the mask layer 28 is formed directly on the egress surface of the modulator panel 29, which obviates alignment problems.

While the embodiments described above employ illuminated PLZT type light valve arrays as the object sources for selectively activatible exposures, one skilled in the art will appreciate that other light exposure means, e.g. illuminated liquid crystal light valve arrays can also be utilized. Similarly, while that embodiment employs a mirror 51 mounted on a bimorph bender element 52 to controllably index the light image from the object array 2, other galvo-mirror systems and image scanner systems, e.g., rotating polygon mirrors, can be utilized.

As shown in FIG. 1, the bimorph bender element 52 is controllably driven by mirror drive circuit 53 to move mirror 51 between the solid and dotted line position shown (in successive increments, or in a continuous pass), so as to index the image of the masked face of light valve array at different locations on the line of record medium M (e.g. photosensitive film or paper) then present at the image zone of station 3. As illustrated, the station 3 can comprise a translatory stage 31 driven by stage drive 32 to shift successive line portions of the supported image medium into alignment at print zone L with the line image from lens system 4 and mirror 51. Although the image of light valve array is magnified at the print station 3 in FIG. 1, it will be appreciated that such image can be at unit magnification or less, as the application requires.

Referring now to FIG. 3, as well as FIG. 1, it can be seen that the object source 2 is constructed so that its exposing elements $L_1$–$L_4$ have a predetermined width (W) in the direction of array length. Also, the individual elements are spaced along the length direction with a predetermined center-to-center spacing (S) and have intermediate opaque sections 43b formed by portions of mask 28.

With a system constructed as described above, the mirror drive circuit 53 and driver control circuit 60 can be coordinated to effect a line exposure in accordance with the present invention. Thus the circuits operate so that exposing source $L_1$ will sequentially address pixel portions $P_{1-1}$ to $P_{1-6}$ at the print zone, source $L_2$ will sequentially address pixel portions $P_{2-1}$ to $P_{2-6}$ at the print zone, source $L_3$ will sequentially address pixel portions $P_{3-1}$ to $P_{3-6}$ at the print zone and source $L_4$ will sequentially address pixel portions $P_{4-1}$ to $P_{4-6}$ at the print zone. This general procedure can be effected in various ways; however, two main features are important. First, the number (M) of sequential exposing actuations to be effected with each light source is selected based on the ratio $(S \div W) \cdot X$ of the exposing element spacing, along the length of the array, to the exposing element width in the direction of the array length, where X is the number of different color expenses per pixel to be effected at the print zone. In the monochrome (X=1) exposing system discussed thus far with respect to FIGS. 1–3, the $S \div W$ ratio is 6, and the discrete locations available for address, e.g. by the source $L_1$, therefore comprise the six pixel portions $P_{1-1}$ to $P_{1-6}$. If desired, the $S \div W$ ratio can differ slightly from the integer number of multiplexed printing sequences performed at the linear image zone. For example, if it is preferred to provide a slight overlap of exposed pixel portions, the $S \div W$ ratio can be somewhat more than the number of multiplexing exposure sequences (M). If a slight spacing is desired between addressed pixel portions, $S \div W$ can be slightly greater than the number of addressed pixel portions. The selection of a preferred $S \div W$ ratio will depend to some extent on the resolution of the optical system. For good results the indexing should be such that the overlap or spacing between pixels as exposed at the print zone not differ by more than about 50% from the condition of edge-to-edge abutment. However, for best imaging quality with a single light color, the pixel portions, e.g. $P_1$–$P_6$ should be uniformly spaced across the $L_1$ sector of the image zone and the number of discrete pixel portions within a sector should be approximately equal to $S \div W$.

Considering the foregoing it can be seen that a second main functional feature is to predeterminedly synchronize the movement of mirror 51 with the light drivers circuit 27. Thus, it is important that, in each section $L'_1$, $L'_2$, etc., the addressed pixel portions (e.g. $P_{1-1}$ to $P_{1-6}$) of the sector are uniformly spaced along the sector length. Conceptually the aim is to actuate the light sources at increments of image movement at the image zone of about the exposing element width (W) times the system magnification factor (F).

FIGS. 1–4 illustrate one preferred approach for implementing such control. As best shown in FIGS. 2 and 3, mask 28 also comprises a plurality of alternating opaque and transparent portions 44a and 44b having a spatial frequency equal to $1 \div W$. In order to allow light from source 21 to pass through grating portions 44a, the support 19 adjacent that grating is transparent. If desired, the support could be omitted or the support could be an electro-optic polarizer sandwich with electrodes energized to a light-transmitting condition.

Referring to FIGS. 1 and 4, it can be seen that a mirror 45 is located along the edge of the optical path of the light passing from source 21 through the grating 44a, 44b of mask 28 so as to direct this light to a photodetector 46 via a grating 47 and lens 48. The grating 47 is constructed to have the same spatial frequency as grating 44a, 44b of mask 28, as imaged at the exposure zone L. That is the grating 47 has a spatial frequency of $F \cdot (1 \div W)$ where F is the system magnification. This cooperative grating system produces a high contrast Moiré pattern; and, as the mirror 51 scans, the light transmitted through grating 47 produces a sinusoidal voltage output signal from photodetector. Thus, each voltage maximum (or minimum) of the photodetector signal will correspond to a multiplex event, i.e. a signal for actuating driver control circuit 60 to gate printing information to the light valve drivers. This synchronization technique is highly useful in avoiding nonuniformities caused by flutter in the bimorph driven mirror. While the optical grating position synchronization system just described is advantageous, other position detection systems, e.g. shaft encoders or drive signal counters, can be used to perform the requisite functions of synchronization. In certain embodiments of the FIG. 4 system lens 48 is not needed.

In operation, print data is input to the driver control (which can be a portion of a microprocessor unit) from a buffer memory where it is stored in a format suitable to load the drivers for sources $L_1$ to $L_4$ with print/no-print information for each of their respective sectors of image pixel portions. That is, at the first stage of the line exposure sequence, the gates to the drivers for sources $L_1$ to $L_4$ are loaded in parallel with data respectively for pixel portions $P_{1-1}$, $P_{2-1}$, $P_{3-1}$ and $P_{4-1}$. At the appropriate sequence signal from detector 46 (indicating that mirror 51 is in the position to address those pixel portions), the gates are signalled to operate drivers for sources $L_1$–$L_4$ in accordance with loaded print/no print data and light is directed to the pixel portions accordingly. Thereafter, data for positions $P_{1-2}$, $P_{2-2}$, $P_{3-2}$ and $P_{4-2}$ are loaded into the gates and await the signal from driver control that mirror 51 has moved to the next appropriate pixel address location. This sequence progresses until each sector has all pixel portions address and stage drive then advances the print stage while mirror 51 returns to the initial position. One skilled in the art will appreciate that a multi-level gray scale imaging of pixels can be achieved using techniques such as described in U.S. Pat. Nos. 4,378,568 or 4,449,153 in conjunction with the present invention.

Although the system depicted in FIGS. 1–4 is an effective and simple method to optically multiplex a light valve array, in certain applications it suffers some undesirable artifacts. As shown in the FIG. 5 diagram, most illumination systems will exhibit some nonuniformity from the center to the edge of the field. Some improvement may be achieved with additional optics and diffusers, but at the expense of decreasing light intensity. While such nonuniformity is not a serious drawback in some conventional illumination systems, it has been found to produce a highly undesirable artifact at the image plane of the multiplexed system such as shown in FIGS. 1–4. To illustrate, the FIG. 5 diagram assigns to the nonuniform illumination distribution at the light valve plane the values $I_1$, $I_2$ ... $I_n$, respectively at light valves 1, 2 ... n. Since the bimorph scans the image of each light valve to a location bordering the original image location of its adjacent light valve neighbor, exposures corresponding to intensities $I_1$, $I_2$, ... $I_n$ will be produced in a stair-step fashion. Therefore, even in the case of ideal light valves with uniform transmittances, there will be discernible exposure variations at the image plane. When the typical distance between multiplex sectors is on the order of 1 mm, sine wave banding visibility is highly undesirable because the eye is very sensitive to nonuniformity in this spatial frequency range.

Figure 5:
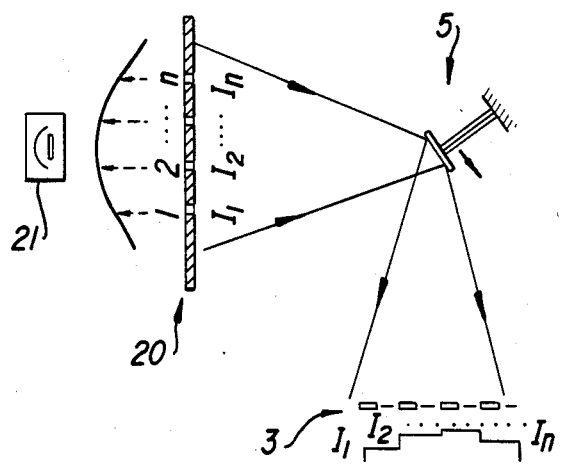
FIG. 5 is a schematic diagram illustrating the mechanisms which cause the banding problems that are solved in accord with the present invention.
Figure 6:
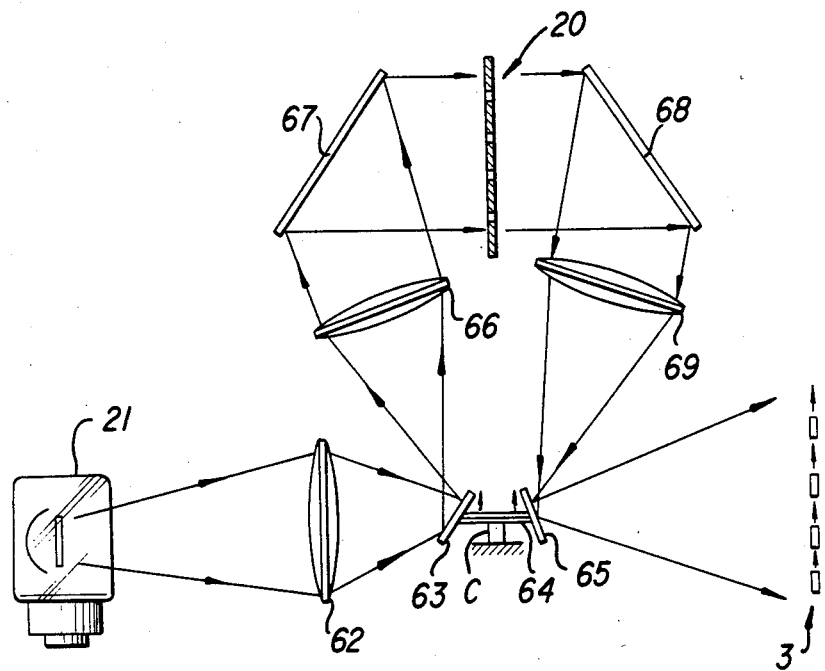
FIG. 6 is a schematic view illustrating a light valve imaging apparatus incorporating one embodiment of the present invention.

In accord with the present invention, "compensated" optically multiplexed systems, based on refractive and reflective optics, have been found to eliminate "stair-stepped" banding patterns such as shown in FIG. 5. FIG. 6 shows schematically one embodiment of such a compensated multiplexed system based on refractive optics. Thus source 21 is imaged by a lens 62 onto a scan-mirror 63 that is mounted at one end on a PZT bimorph 64. In this embodiment the bimorph 64 has a second mirror 65 mounted on its opposite end and is clamped by member C to support those mirrors symmetrically. That is, the bimorph bender has a uniform construction along its length and is clamped centrally so that the arms extending to mirrors 63 and 65 are of equal length. When a given voltage is applied to the bimorph, the mirrors 63 and 65 scan symmetrically through the same angle because the beam deflections on either side of the clamp are equal.

Following the reflection off the first bimorph mirror, the source light passes through lens 66, which is constructed and located to collimate the light beam, e.g. having its focal length equal to its distance from the first bimorph mirror 63. The light beam is then reflected by mirror 67 so as to ingress the light valve array 20. The illumination intensity pattern of the source light beam at the ingress surface of array 20 corresponds to that at an image plane in the vicinity of lens 62, as projected by lens 66. The illumination pattern, i.e. light distribution pattern, is not stationary, however, since it is scanned by the motion of the first bimorph mirror 63.

Figure 7:
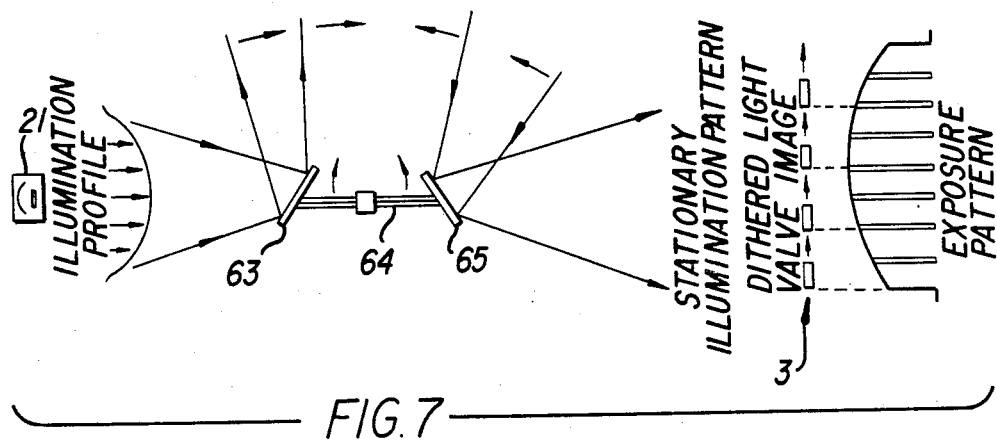
FIG. 7 is a schematic diagram illustrating the nature of improved image uniformity attained in accord with the present invention.

After the scanning source illumination pattern is transmitted through the light valve array 20, it is reflected by mirror 68 to pass through lens 69, which, in turn, focuses the light on the second bimorph mirror 65. Thus, the first scan-mirror and the source are both imaged onto the reflective surface of the second scan-mirror 65. Lens 69 also serves the purpose of imaging the light valve array 20 at the final image plane 3, where exposure occurs. Since the array 20 is imaged after reflection off the second scan-mirror 65, the image is indexed as described with respect to FIGS. 1–4 to achieve the desired optical multiplexing. However, illumination pattern of source 21 undergoes two scans from the first and second scan-mirrors 63 and 65, respectively. The optical geometry of the FIG. 6 system is designed so that the two scans are compensating in nature, i.e. so that the illumination pattern of source 21 is approximately stationary at plane 3, regardless of the scan-mirrors' position. Optimum compensation can be easily achieved in practice by adjusting the clamping position of the bimorph 64. The remarkable effect of this compensation technique produces the smooth illumination intensity pattern shown in FIG. 7, which eliminates the banding pattern shown in FIG. 5.

Figure 8:
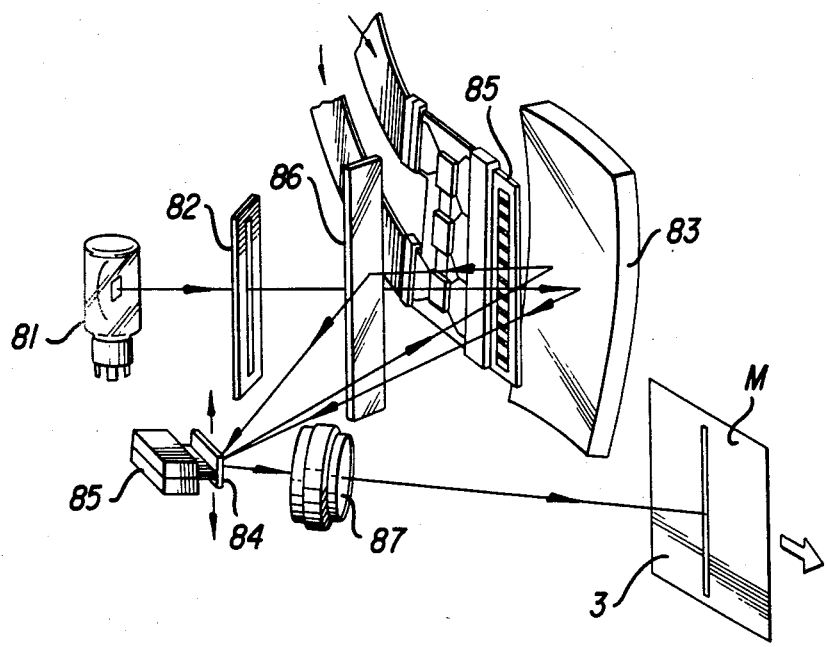
FIG. 8 is a perspective view illustrating another preferred embodiment of imaging apparatus in accord with the present invention.

Referring to FIG. 8, there is shown a folded optically multiplexed printer, which is constructed in accord with the present invention. This embodiment provides advantages in compactness and in avoiding the need for large aperture imaging optics. Thus the FIG. 8 system source 21, which has a small filament, directs light through a slitted mask 82, onto a spherical mirror 83. In this embodiment the source filament is positioned off axis, but close to the radius of curvature of the mirror 83, so that it will be imaged symmetrically on the other side of the optical axis of the mirror. A small mirror 84 mounted on a PZT bimorph 85 is positioned so that it intercepts the filament image and reflects it back towards the spherical mirror 63. The source filament 81 and bimorph scan-mirror 84 are constructed as conjugates of each other; however, mirror 84 is tilted so that, after reflection therefrom, the optical axis is directed toward a different part of spherical mirror 83 than the beam from slit 82. Light valve array 85 is positioned to intercept the light after the second reflection from the spherical mirror 83; and a flat mirror 86 is located to reflect the light transmitted through array 85 back to the scan-mirror 84. After such second reflection from scan-mirror 84, the source light is directed to a lens 87, which is constructed and located to project an image of the light valve array 20 onto a photosensitive material M at the exposure plane 3. By means of this second reflection from the scan-mirror 84, the light valve array image is indexed as described above, i.e. multiplexed, at the image plane. The illumination source intensity pattern, however, undergoes two, compensating scans, as in the FIG. 6 embodiment, and results in a substantially stationary illumination intensity profile at the image plane so as to accomplish the desired results of the present invention.

It is preferred to locate the slitted mask 82 so that it is imaged by the spherical mirror 83 at the plane of the light valve array 85. Therefore, the slit is preferably located somewhere between the focus and the radius of curvature of the spherical mirror 83. It should also be noted that in order to maintain the source 81 and bimorph mirror 84 as conjugates, the source should be positioned beyond the radius of curvature of mirror 83 whereas the driven scan-mirror 84 should be positioned within the radius of curvature of that mirror. This is desirable in order to compensate for any additional pathlength introduced by the reflection from the flat mirror 86.

Figure 9:
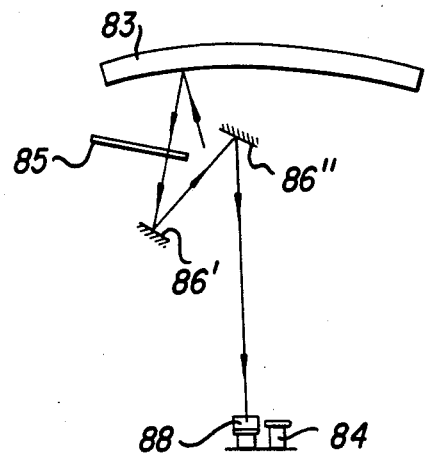
FIG. 9 is a diagram illustrating one useful alternative configuration to the FIG. 8 embodiment.
Figure 10:
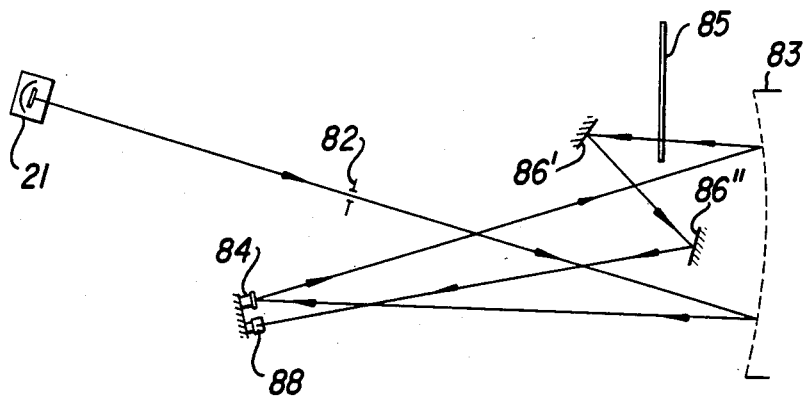
FIG. 10 is a diagram illustrating the optical path of the FIG. 9 embodiment.

In some constructions similar to the FIG. 8 embodiment, e.g. when long light valve arrays are used, an undesirable component to the scan is evident at the image plane. This can result because the scan axis of the bimorph mirror is not colinear with the light valve array direction and the scanning occurs along the arc of a circle instead of along a line. The effect is most noticeable in images of the light valves at the extreme ends of the array, and the modified embodiment shown in FIGS. 9 and 10 can be employed to eliminate this problem. In such modification the final illumination path to the scan-mirror is collinear to the scan axis. Since the array must be imaged the last time the light reflects across the scanning mirror, a second mirror 88 tilted at 45° may be mounted on the bimorph (i.e., directing light out of the plane of the FIG. 9 schematic). If additional compensation is necessary, a separate PZT bimorph may be used for the second mirror. FIG. 10 shows a ray trace diagram of a folded system such as mentioned above. Systems such as described with respect to FIGS. 8-10 (based on an 8" radius of curvature spherical mirror) fit confortably into a 10"×16" area, approximately one-eighth the space required for systems such as shown in FIG. 6. Although it is preferred that the spherical mirror 83 be of imaging quality, it may be replaced by a less expensive, condenser quality mirror.

The invention has been described in detail with particular reference to preferred embodiments thereof, but it will be understood that variations and modifications can be effected within the spirit and scope of the invention.

We claim:

1. In light valve imaging apparatus of the kind having (i) a linear light valve array comprising a plurality of selectively activatible light valve portions having approximately equal linear widths and spaced by intermediate non-transmissive portions, (ii) source means for directing generally uniform illumination through said light valve portions, (iii) means for forming an image of said light valves at a generally linear image zone and (iv) multiplexing means for scan-indexing the image of said light valves along said image zone in a plurality of increments, the improvement comprising source-scan means for scan-indexing the illumination from said source means onto said light valve array in synchronism with the scan-indexing by said multiplexing means.

2. The invention defined in claim 1 wherein said source-scan means and said multiplexing means comprise mirrors symmetrically located in the optical path of said apparatus with respect to the ingress and egress of said light valve array.

3. The invention defined in claim 1 wherein said source-scan means and said multiplexing means comprise a common mirror member.

4. An electronic imaging system for light exposing a linear image zone at relatively high resolution, said system comprising:
 (a) exposure means comprising a light source and an array of selectively activatible light valve elements of width (W) spaced at linear intervals (S);
 (b) means for forming an image of said light valve elements at a linear image zone;
 (c) egress scan means for scanning the image of said light valve elements linearly along said image zone in number of equal and successive increments (M) approximately equal to $(S \div W) \cdot X$, where X is an integer representing the number of different colors to be exposed during a line scan; and
 (d) ingress scan means for scanning said light source onto said light valve ingress in synchronism with said egress scan means.

5. An electronic imaging system for light exposing a linear image zone at relatively high resolution, said system comprising:
 (a) an exposure array comprising a plurality of spaced, selectively activatible light valve elements;
 (b) source means for directing light toward an ingress surface of said exposure array;
 (c) means for forming an image of said exposure array at a linear image zone;
 (d) egress scan means for scanning the light image of said array linearly along said image zone; and
 (e) ingress means for scanning said source light linearly along said array in timed relation with said egress scan means.

6. A system for selectively light-exposing a plurality of pixel portions forming a record medium line, said system comprising:
 (a) a light valve array comprising a plurality of selectively activatible pixel portions disposed in spaced relation along a linear direction in an object plane;
 (b) means for moving successive line portions of a record medium through a linear imaging zone;
 (c) means for imaging said light valve array along said linear imaging zone;
 (d) means, located along the optical path of said imaging means, for scanning the light image of said object array to a plurality of different positions at said linear imaging zone;
 (e) means for selectively activating said light valve array, at each of said plurality of positions, in accordance with an input image information signal;
 (f) a source of directing light to said light valve array ingress; and
 (g) means, located along the path between said light source and said light valve array, for scanning said light source on said array ingress in synchronism with said light image scan.

* * * * *